United States Patent [19]

Kelley

[11] 4,396,760
[45] Aug. 2, 1983

[54] POLYAMINOESTER RESINS FROM ACRYLIC TERMINATED POLYETHYLENE MALEATES AND POLYFUNCTIONAL AMINES

[75] Inventor: Everett J. Kelley, Moorestown, N.J.

[73] Assignee: Rohm and Haas Company, Philadelphia, Pa.

[21] Appl. No.: 373,373

[22] Filed: Apr. 30, 1982

[51] Int. Cl.³ .............................................. C08G 69/26
[52] U.S. Cl. .................................... 528/345; 521/184; 524/602; 525/420; 528/205; 528/211; 528/341; 528/342
[58] Field of Search ............... 528/353, 345, 205, 211, 528/341, 342

[56] References Cited

U.S. PATENT DOCUMENTS 4,180,632 12/1979 Ilenda .................................. 521/184

Primary Examiner—Harold D. Anderson

[57] ABSTRACT

A thermosettable polyaminoester composition useful as a plastic, coating, resin modifier, and elastomer is provided. The thermosettable polyaminoester is formed by reacting one or more acrylic or methacrylic terminated polyalkylene maleate or fumarate oligomers with one or more polyamines and optionally with one or more alpha, beta-ethylenically unsaturated monomers. The composition is especially useful in the RIM process.

7 Claims, No Drawings

POLYAMINOESTER RESINS FROM ACRYLIC TERMINATED POLYETHYLENE MALEATES AND POLYFUNCTIONAL AMINES

BACKGROUND OF THE INVENTION

1. Field of the Invention

This invention relates to thermosettable polymeric compositions useful as plastics, coatings, resin modifiers, and elastomers. The compositions are especially useful in the RIM process.

2. Description of the Prior Art

Ilenda, U.S. Pat. No. 4,180,632 shows polymers of acrylic acid monomers having an average acrylate functionality of at least 2.5 reacted with low molecular weight aliphatic amines to form polyamino esters. The Ilenda system is used for RIM.

3. Cross Reference to Related Applications

Related application U.S. patent application Ser. No. 373,372, filed on Apr. 30, 1982 shows acrylic and methacrylic terminated polyalkylene maleate oligomers which are crosslinkable with amines.

Related application U.S. patent application Ser. No. 373,371, filed on Apr. 30, 1982 shows polyalkylene maleate oligomers reacted with polyfunctional amines in a RIM (reaction injection molding) process to produce rigid thermosetting compositions.

SUMMARY OF THE INVENTION

Although the prior art Ilenda system provides thermosetting resins, especially for RIM, of excellent properties, for certain applications a more economical process using more available raw materials would be desirable.

It is therefore an object of the present invention to provide novel thermosetting compositions which are prepared from more available raw materials than the Ilenda process.

A further object is to prepare RIM compositions having improved properties as compared to prior RIM compositions.

These objects and others as will become apparent from the following description, are achieved by the present invention which comprises thermosetting polymer compositions comprised of the reaction product of one or more oligomers of the formula:

$$CH_2=C-C-[OCHCH-OCCH=CH-C]_n-OR''' \quad (I)$$
$$\phantom{CH_2=}\,|\,\phantom{C-C}\|\phantom{[}\,|\,\,|\phantom{OCHCH}\|\phantom{OCCH=CH}\|$$
$$\phantom{CH_2=C}R\phantom{-C-[O}R'\,R''$$

wherein
n=2–10, and
R=H or CH$_3$
R' and R"=H, —CH$_3$ —C$_2$H$_5$, —CH$_2$Cl, —CH$_2$Br, —C$_6$H$_5$(phenyl), —CH$_2$OCOCH=CH$_2$, —CH$_2$OCOC(CH$_3$)=CH$_2$, —CH$_2$OCH$_2$CH=CH$_2$, —CH$_2$OC$_6$H$_5$, —CH$_2$OC$_4$H$_9$, or R'+R"=—C$_4$H$_8$—
R'''=—H or —CHR'CHR"OH
with one or more polyamines and, optionally, one or more alpha, beta-ethylenically unsaturated monomers.

DETAILED DESCRIPTION OF THE INVENTION AND THE PREFERRED EMBODIMENTS

The thermosettable polymeric compositions of the invention are useful as plastics, coatings, resin modifiers, and elastomers. They are especially useful in the RIM process.

They are prepared by the reaction of one or more polyfunctional amines, optional alpha, beta-ethylenically unsaturated monomers, and oligomers of the formula:

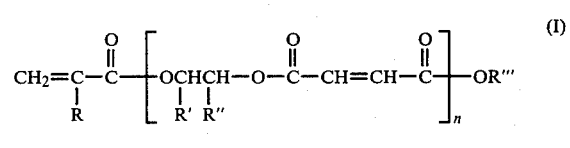

wherein
n=2–10, and
R=H or CH$_3$
R' and R"=H, —CH$_3$, —C$_2$H$_5$, —CH$_2$Cl, —CH$_2$Br, —C$_6$H$_5$(phenyl), —CH$_2$OCOCH=CH$_2$, —CH$_2$OCOC(CH$_3$)=CH$_2$, —CH$_2$OCH$_2$CH=CH$_2$, —CH$_2$OC$_6$H$_5$, —CH$_2$OC$_4$H$_9$, or R'+R"=—C$_4$H$_8$—
R'''=—H or —CHR'CHR"OH The oligomers of formula I are prepared, preferably, by reacting an initiator having the formula:

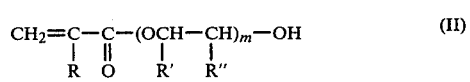

wherein R, R', and R" are as previously defined and m=0 or 1 with maleic anhydride and an epoxy compound such as ethylene oxide in mole ratios of 2 to 10 moles maleic anhydride and 1 to 11 moles of epoxy compound per mole of initiator. The initiator, which provides the meth(acrylate) functionality to the resultant oligomers, can be acrylic acid, methacrylic acid, or 2-hydroxyalkyl methacrylate such as hydroxyethyl methacrylate (HEMA) with the latter being preferred.

A wide variety of catalysts can be employed in catalytic amounts, usually about 0.1 to 2.0%, with the preferred catalyst being quaternary ammonium salts, calcium, magnesium and lithium halides, and tertiary amines. Specific examples of suitable catalysts are tetramethylammonium bromide, tetramethylammonium chloride, tetramethylammonium methyl sulfate, lithium chloride or bromide. The preferred catalysts promote the 1:1 reaction between anhydride and epoxide with little or no homopolymerization of the epoxide.

The unsaturated acrylic or methacrylic initiator can be acrylic acid, methacrylic acid, 2-hydroxyalkyl acrylate, or 2-hydroxyethyl methacrylate. Other monomers can be substituted in part or completely for the acrylic or methacrylic initiator; for example, crotonic, itaconic citraconic, alpha-methylene glutaric acid, and the like.

A minor amount of the maleic anhydride can be replaced by other carboxylic acid anhydrides such as phthalic, succinic, tetrahydrophthalic, hexahydrophthalic, itaconic, mellitic, and the like.

Epoxides which can be used are ethylene, propylene, butylene, isobutylene and styrene oxides, epichlorohydrin, glycidyl acrylate or methacrylate, epibromohydrin, allyl glycidyl ether, phenylglycidyl ether, butyl glycidyl ether, cyclohexene oxide, or mixtures of such epoxides.

The aforementioned molar ratios are an important feature of the present invention because of the intended utility as reactants with polyamines in the RIM process to produce thermosetting resins. At least two and preferably three or more maleate functional groups are required for reaction with polyamines for this purpose. Some maleate can be isomerized to fumerate as long as at least two maleates per molecule remain.

The alkylene oxide mole ratio is kept near the available carboxylic acid ratio or one mole deficit depending on whether the ester or acid terminal group is desired.

The reaction is conducted at a temperature of about 50° to 120° C. and more preferably 70° to 105° C., by introducing the raw materials all at once or preferably by adding the acid or hydroxyalkyl ester of the acid initiator to the molten maleic anhydride and any other anhydride, and then adding the epoxy compound at a controlled rate to complete the polymerization.

The reaction can be conducted in the absence or the presence of a solvent such as benzene, toluene, and the like.

Polymerization inhibitors such as hydroquinone, hydroquinone monomethyl ether, phenothiazine, copper powder, and the like can be employed.

The polyfunctional amines are selected from the group consisting of:

| | |
|---|---|
| $H_2N-(CH_2-CH_2-NH)_n-H$ | wherein n = 1 to 4 |
| $H_2N-(CH_2)_n-NH_2$ | wherein n = 3 to 6 |
| $H_2N-C_3H_6NH-C_3H_6-NH_2$ | |
| $NH_2-C_3H_6-NH-C_2H_4-NHR$ | wherein R = —H or —$C_3H_6NH_2$ |

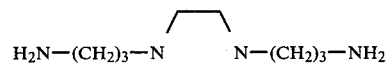

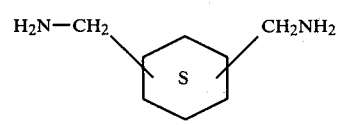

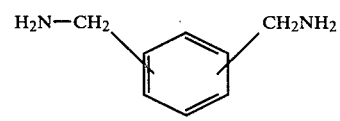

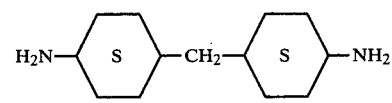

These polyamines and the oligomers react rapidly via an exothermic Michael type addition reaction to produce a thermosetting polymeric product, preferably in the absence of a catalyst, although a catalyst is preferably used to promote removal of residual acrylic and maleic unsaturation, especially when optional additional comonomers such as styrene or methyl methacrylate are used.

In such instances, suitable free-radical initiators such as peroxides or azo compounds are employed to promote copolymerization during a post cure.

The thermosettable compositions of the invention can include fillers, fibers, fiberglass, antioxidants, inhibitors, colorants and foaming agents.

The compositions of the invention can be used as plastics, coatings, resin modifiers, elastomeric products, but are especially useful in the RIM process wherein the liquid mixture is rapidly mixed and injected into a mold where it reacts and gels. In a post cure operation, the molding can be heated to cure and further crosslink the article.

The following non-limiting examples are presented to illustrate a few embodiments of the invention.

EXAMPLES

1. Methacrylate terminated polyethylene maleate (36 parts) (wherein n=3, R=—$CH_3$, R' and R"=—H, and R'''=$C_2H_4OH$) was dissolved in styrene (12 parts) along with initiators di-tert-butylperoxide (0.12 parts) and benzoyl peroxide (0.1 parts). m-Xylenediamine (12 parts) was then added with rapid stirring for 15 seconds and the mixture poured into an open faced mold (on glass plate). Gelling was very rapid; a peak exotherm of 77° C. reached in 30 seconds (10 g. sample) with gelling in 20 seconds was typical for this mix. The ⅛" thick gelled sheet was removed from the plate and cured at 80° C.-2 hours, 100° C.-2 hours, 130° C.-2 hours, and 170° C.-1.5 hours to give a hard, clear, amber colored sheet with the following properties:

| | |
|---|---|
| Tensile-psi | 10,241 |
| Tensile Modulus-psi | 411,593 |
| Tensile Elongation % | 6.95 |
| VICAT (ASTM) | 213° C. |
| Izod Impact-(notched) ft. lbs. | 0.25 |
| Rockwell Hardness | M-94 |

2. Methacrylate terminated polyethylene maleate (wherein n=2, R=—$CH_3$, R' and R"=—H, and R'''=$C_2H_4OH$) (65 parts) was dissolved in methyl methacrylate (16 parts) to which was added di-tert-butyl peroxide (0.2 parts). meta-Xylenediamine (19 parts) was added to the mix in one portion with rapid stirring. A vigorous reaction occurred with a peak exotherm of 74° C. in 40 seconds. The mixture thickened to high viscosity but did not gel. It was subsequently post cured by heating to 130° C. in 45 minutes and holding for one hour to produce a hard, clear, amber colored polymer.

3. Methacrylate terminated polyethylene maleate (wherein n=2, R=—$CH_3$, R' and R"=—H, and R'''=—$C_2H_4OH$) (67 parts) was dissolved in methyl methacrylate (16 parts) containing di-tert-butyl peroxide (0.2 part). N,N'-Diaminopropylethylenediamine (17 parts) was added to the mix in one portion with rapid stirring. A vigorous reaction ensued with a peak exotherm of 82° C. in 60 seconds. Gelling occurred in less than a minute. The gel was post cured for an hour at 130° C. to produce a hard polymeric product.

I claim:

1. A thermosetting polyaminoester resin composition comprising the reaction product of one or more acrylic or methacrylic terminated polyalkylene maleate or fumarate oligomers of the formula

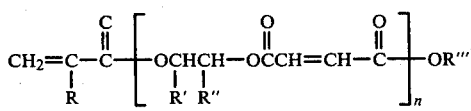

(I)

wherein n is 2 to 10,

R is H or CH₃,

R' and R" are —H, —CH₃, —C₂H₅, —CH₂Cl, —CH₂Br, —C₆H₅(phenyl, —CH₂OCOCH=CH₂, —CH₂OCOC(CH₃)=CH₂, —CH₂OCH₂=CH₂, —CH₂OC₆H₅, —CH₂OC₄H₉, or R' together with R" form —C₄H₈-(cyclic), and R''' is H or —CHR'CHR"OH, with one or more polyamines.

2. Composition of claim 1 further comprising the reaction product of said oligomers and said polyamines with one or more alpha, beta-ethylenically unsaturated monomers.

3. Composition of claim 1 wherein the polyamine is selected from the group consisting of:

H₂N—(CH₂—CH₂NH)ₙ—H wherein n is 1 to 4,

H₂N—(CH₂)ₙ—NH₂ wherein n is 3 to 6,

H₂N—C₃H₆NH—C₃H₆—NH₂,

NH₂—C₃H₆—NH—C₂H₄—NHR wherein R is —H or —C₃H₆NH₂,

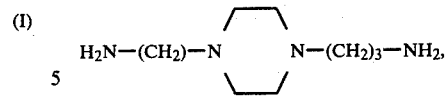

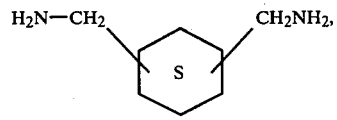

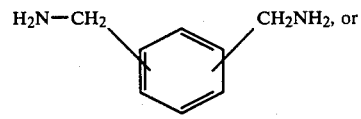

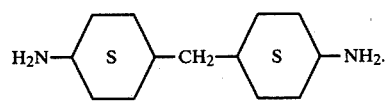

4. Composition of claims 1 or 2 wherein the oligomer is polyethylene maleate containing 2 to 10 maleate repeating units.

5. Composition of claims 1 or 2 wherein the polyamine is selected from bis(p-aminocyclohexyl)methane, m-xylenediamine, 1,3-propylene diamine, N,N'-di(aminopropyl)-ethylene diamine, or tetraethylene pentamine.

6. Composition of claims 1 or 2 wherein the oligomer is a methacrylic terminated polyethylene maleate.

7. Composition of claim 2 wherein said monomers are selected from styrene or methyl methacrylate.

* * * * *

UNITED STATES PATENT AND TRADEMARK OFFICE
CERTIFICATE OF CORRECTION

PATENT NO. : 4,396,760

DATED : August 2, 1983

INVENTOR(S) : Everett J. Kelley

It is certified that error appears in the above—identified patent and that said Letters Patent is hereby corrected as shown below:

Col. 5, line 15, "—$CH_2OCH_2$=$CH_2$" should be -- —$CH_2OCH_2CH$=$CH_2$ --

Signed and Sealed this

Sixth Day of December 1983

[SEAL]

Attest:

GERALD J. MOSSINGHOFF

*Attesting Officer*  *Commissioner of Patents and Trademarks*